Sept. 23, 1969  J. FERRIER  3,468,557
ANTI-SWAY DEVICE FOR USE BETWEEN A TOWING
VEHICLE AND TRAILER
Filed Nov. 3, 1967  3 Sheets-Sheet 1

Sept. 23, 1969  J. FERRIER  3,468,557
ANTI-SWAY DEVICE FOR USE BETWEEN A TOWING
VEHICLE AND TRAILER
Filed Nov. 3, 1967  3 Sheets-Sheet 2

Sept. 23, 1969  J. FERRIER  3,468,557
ANTI-SWAY DEVICE FOR USE BETWEEN A TOWING
VEHICLE AND TRAILER
Filed Nov. 3, 1967  3 Sheets-Sheet 3
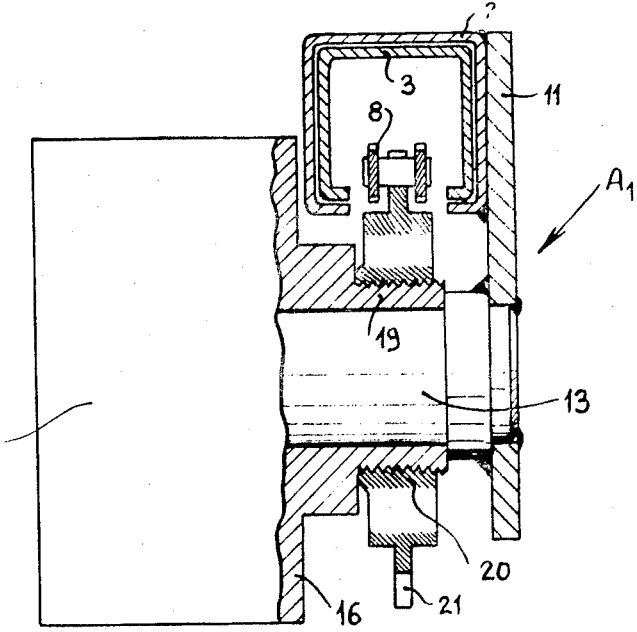
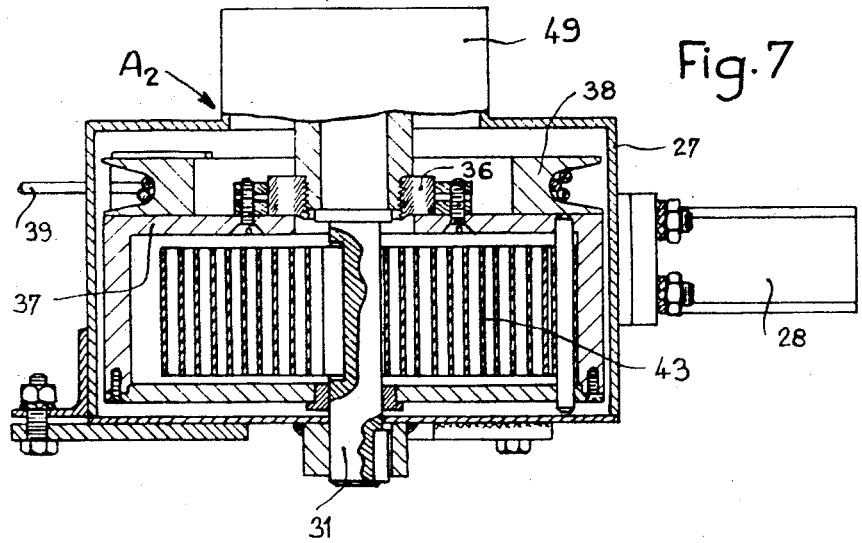

United States Patent Office 3,468,557
Patented Sept. 23, 1969

3,468,557
ANTI-SWAY DEVICE FOR USE BETWEEN A
TOWING VEHICLE AND A TRAILER
Jean Ferrier, Cousance, Jura, France, assignor to Etablissements Jean Ferrier, Cousance, Jura, France, a French joint-stock company
Filed Nov. 3, 1967, Ser. No. 680,448
Claims priority, application France, Nov. 7, 1966, 47,905
Int. Cl. B60d 1/16
U.S. Cl. 280—446                                    10 Claims

ABSTRACT OF THE DISCLOSURE

An anti-sway device is provided for mounting between a towing vehicle and a trailer. The device is mounted asymmetrically and is capable of extension and contraction. A brake is applied via a freewheel device to restrain extension, but the freewheel prevents the brake operating during contraction. The extensible device may be a cable anchored at one end to a pulley spring loaded into a "wound-up" condition and the brake may be a friction plate or hydraulic brake.

---

Figure 1:
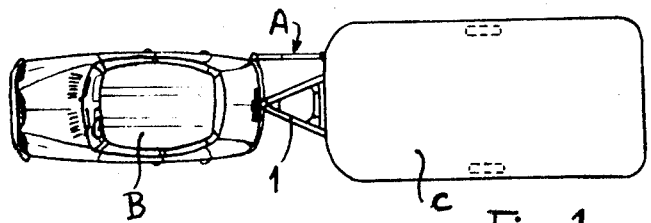

The present invention relates to an anti-sway device which is intended for fitting to road trailers and more particularly to touring house trailers.

It is known that the weight distribution inside a touring house trailer is not always what it ought to be to guarantee the best road-holding behind a towing vehicle. In addition, even if the loads are correctly distributed, the driver may travel at too high a speed. For these reasons, it will frequently be observed that above a certain speed the trailer begins a swaying movement which increases progressively and becomes extremely dangerous.

In order to minimize this problem, different systems have been proposed for insertion between a house trailer or similar trailer and the towing vehicle. However, the known systems generally exert a braking effect in both directions, which in consequence aims at slowing down indiscriminately all relative movements of the towing vehicle and the towed house trailer. These systems are therefore a hindrance for driving and, moreover, experience shows that their effectiveness is not very great as regards the road holding of the house trailer.

The invention has the main aim of avoiding these disadvantages by creating an anti-sway device which procures good stability of the coupled units even at high speed.

According to this invention an anti-sway device intended to be mounted between a towing vehicle and a trailer vehicle comprises an extensible device which can be connected between the towing vehicle and the trailer in an asymmetrical manner so that it is subjected to length variations in response to any misalignment of the two vehicles, there being a braking mechanism coupled to the extensible device through a unidirectional device, whereby the braking force is applied only in one direction of length variations of the extensible device.

According to one method of carrying out the invention the device comprises a telescopic arm which is coupled between the rear of the towing vehicle and the front of the house trailer at one side only of the coupled unit, one of the sliding parts of this arm being attached to a rack while the other carries the shaft of a free-wheel pinion which is engaged with the teeth of the rack and which for one direction of rotation only, drives a friction disc of adjustable loading.

In countries where vehicles must travel on the right hand side of the road, right hand turns are generally tighter than left hand turns. For these countries, it is preferred to mount the device on the right hand side, and to arrange the free wheel so that the brake is applied in the direction of extension of the device, so that contraction takes place without braking. On the other hand, in countries where vehicles must travel on the left hand side, it is the left hand turns which are generally tighter and therefore the device should preferably be mounted on the left hand side.

In another possible method of carrying out the invention, there is fixed on the trailer a casing inside which there turns a drum or a pulley on which is wound and anchored one of the ends of a cable, of which the other end is intended to be fixed to the corresponding side of the rear of the towing vehicle. The drum or pulley is returned in the direction which winds up the cable by a helical spring, while it is linked by a freewheel mechanism to a revolving friction plate. This plate is retained against a friction lining, which itself bears on an opposite plate fixed against rotation and of which the loading may be adjusted by turning a nut which compresses some resilient material. The freewheel is mounted in such a way that the drum or pulley is freed from the turning friction plate when the cable tends to be wound up under the action of the return spring.

It will be understood that in all cases such a device has an asymmetric braking effect on the house trailer when the latter begins a swaying movement, which prevents any development in the size of this movement through the effect of resonance. Moreover, this does not interfere with action of the inertia brake if the house trailer is fitted with one, at least in the direction of the contraction of the telescopic arm or of the winding up of the cable.

Figure 2:
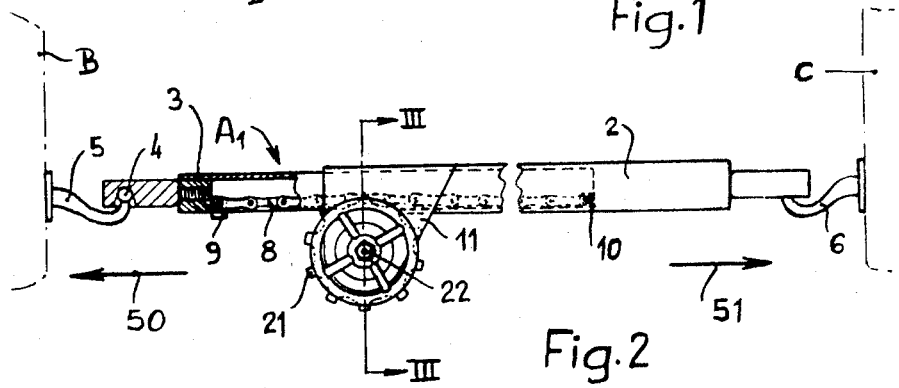
Figure 3:
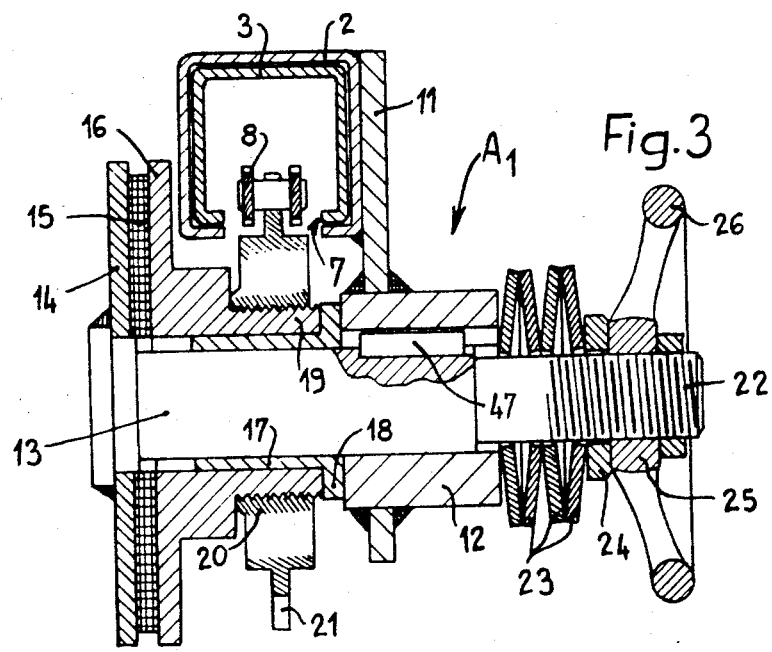
Figure 4:
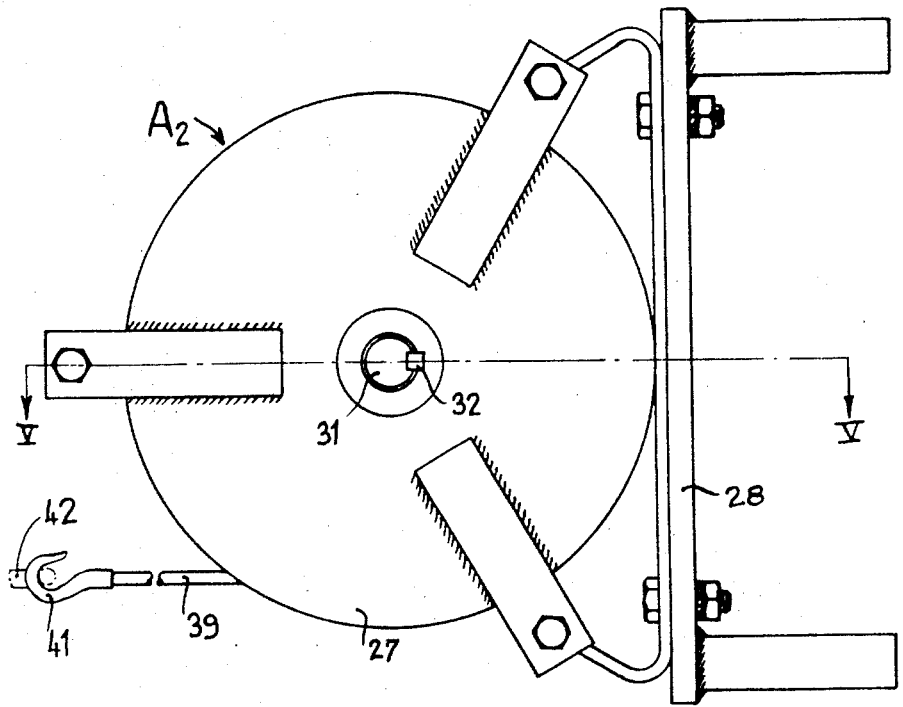
Figure 5:
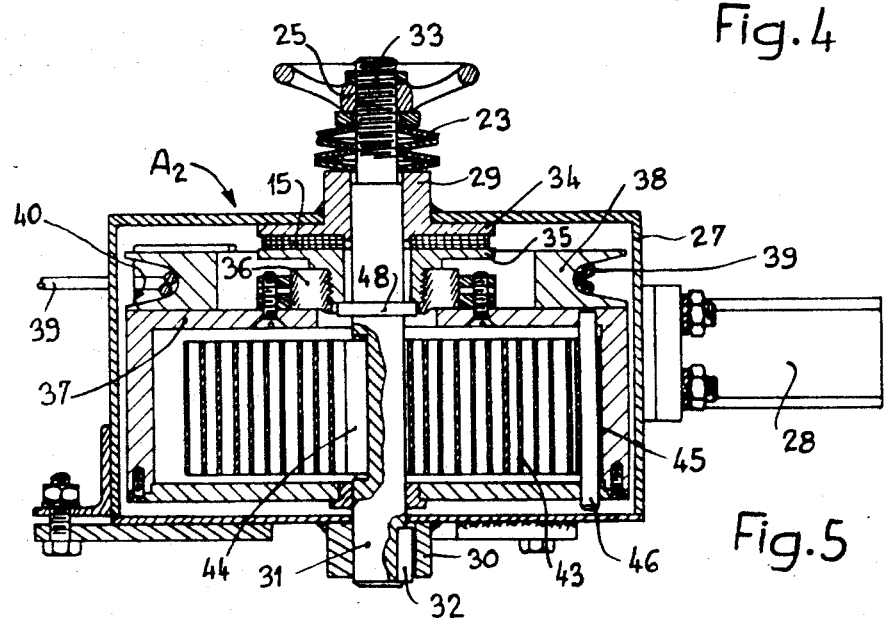

Several constructions in accordance with the invention will now be described by way of examples only, with reference to the accompanying drawings, in which:

FIGURE 1 is a plan view of a coupled towing vehicle and house trailer fitted with a stabilizing device according to the invention, FIGURE 2 is a side-elevation of the device to a larger scale, FIGURE 3 is a section along the line III—III in FIGURE 2, FIGURE 4 is a side-elevation of another possible method of construction of a device according to the invention, FIGURE 5 is a section along the line V—V in FIGURE 4, FIGURE 6 is a view similar to FIGURE 3 showing a telescopic arm of which the braking is carried out by hydraulic means, and FIGURE 7 shows another variant similar to that in FIGURE 5, in which the braking of the cable pulley is carried out by hydraulic means.

The device A is intended to be interposed between the rear of a motor vehicle B and the front of a trailer or touring house trailer C. The coupling of the trailer may be made by a beam 1. The device A is fitted in an asymmetrical way at one of the sides of the assembly B–C, and is illustrated on the right side, as for use in countries where vehicles travel on the right hand side of the road and, in general, turns to the right are tighter than turns to the left. It will be understood that in countries where vehicles travel on the left, the device A should be fitted on the left hand side.

There is shown in FIGURES 2 and 3 a first possible method of construction of the device A, and it has been indicated by the general reference $A_1$. (The reference $A_2$ corresponds to another possible constructional variant, shown in FIGURES 4 and 5.)

The device A is formed by two bars 2 and 3 which slide one within the other to constitute a telescopic arm. At its forward end, the bar 3 is adapted to receive a ball 4 which is fixed by a support 5 on the rear of the vehicle B. The rear end of the bar 2 is adapted to be joined in the same way to a ball which a support 6 allows to be fixed to the front of the house trailer C.

The bar 3 slides within the bar 2. Each of these two bars is constituted by a metal extrusion formed into a partially closed U section, so that the telescopic arm 2–3 has throughout its length a longitudinal slot 7 on its underside. There is fitted within the inside bar 3 a rack which is preferably constituted by a transmission chain 8 held taut by anchorages 9 and 10 provided at its ends. This chain 8 is in consequence fixed to the bar 3 within which it is placed.

On the external bar 2 there is welded a lateral lug 11 which is fitted with a bearing 12 in which is mounted a sliding transverse shaft 13. A sliding key 47 fixes the shaft 13 against rotation within its bearing 12.

One of the ends of the shaft 13 is welded on to a friction plate 14, against the inner face of which is placed a flat annular lining 15. Against this lining is placed another plate 16 in which is sleeved a bearing-bushing 17, which is free to revolve on the shaft 13. This bushing 17 has a flange 18 which bears against the fixed bearing 12, and against which the hub 19 of the plate 16 is pressed in the longitudinal direction.

There is screwed on to the hub 19 of the plate 16, a free-wheel 20 which carries a pinion 21 around its circumference. This assembly 20–21 may with advantage be constituted by a bicycle free-wheel pinion. The teeth of the pinion 21 engage with the rack constituted by the chain 8.

At the other side of the bearing 12, the shaft 13 ends in a threaded portion 22 around which is fitted a stack of several conical washers 23 or a spring of known type. These washers are held compressed between the bearing 12 and a thrust washer 24 by a nut 25 operated by hand by means of a wheel 26 fitted to it. Naturally, this wheel 26 could be replaced by wings, by a handle or by any other equivalent component.

The free-wheel is chosen in such a way that the pinion 21 is fixed to the hub 19 when the telescopic arm 2–3 is extended, as shown in FIGURE 2 by the arrows 50 and 51, while on the contrary, the pinion is freed from the hub 19 when the telescopic arm 2–3 is contracted. An example of a unidirectional or one-way type of clutch suitable as a coupling means between the hub and pinion is shown in FIGURE 5 (at 10–15) of the U.S. Patent 1,977,317.

The operation of this device is as follows:

If the trailer C begins a swaying movement when the vehicle B is running, there results a periodic extension and contraction of the telescopic arm 2–3. All relative movement of the bars 2–3 is accompanied by a rotation of the pinion 21 which rolls along the chain 8 in one direction or the other. When this rotation corresponds to an extension of the arm 2–3 in the direction shown by the arrows 50 and 51, the plate 16 turns in relation to the fixed plate 14 and there is observed in consequence a braking effect at the surface of the friction lining 15 which is held compressed by the spring action of the stack of washers 23. This braking effect may be regulated by tightening the nut 25 to a greater or lesser degree.

On the contrary, when the arm 2–3 is contracted, the pinion 21 is freed from the hub 19, so that the bar 3 slides freely inside the bar 2. An asymmetric braking effect is therefore exerted on the variations in length of the telescopic arm 2–3, which has the result of damping any swaying movement.

The device $A_2$ shown in FIGURES 4 and 5 comprises a hollow casing 27 which is rigidly fixed to the front of the house trailer C, by means of a bracket or similar fixing 28. This casing is of cylindrical shape, and it carries on its lateral faces two central bearings 29 and 30. A shaft 31, sliding in the longitudinal direction, is carried by these bearings 29 and 30. In addition a sliding key 32 locks the shaft 31 against rotation inside the bearing 30.

The shaft 31 projects beyond the bearing 29 by a threaded portion 33 on which is screwed a nut 25 which compresses the stack of spring washers 23 against the bearing 29.

The bearing 29 is fixed to a friction plate 34 which is applied rigidly against the corresponding internal face of the casing 27. As previously, a friction lining 15 is fitted, held pressed against the fixed plate 34 by a revolving thrust-plate 35. The hub of the revolving plate 35 is attached to the hub of a free-wheel mechanism 36 of known type, of which the periphery is fixed to a hollow cylindrical cage 37. This latter turns freely about the shaft 31 and it is attached to a drum or pulley 38 on which are wound several turns of a cable 39. One of the ends of the cable 39 is anchored to the drum 38, by known means not shown. The cable 39 passes through the wall of the casing 37 by an opening 40, and it carries at its external end an anchoring hook 41. The latter is intended to be hooked to an eye 42 or similar device provided at the rear of the towing vehicle, on the appropriate side.

The hub of the free-wheel mechanism 36 bears on a stop-collar 48 provided transversally on the shaft 31. Owing to this arrangement, the plate 35 is held pressed against the lining 15 under the return action of the stack of spring washers 23.

There is fitted inside the cage 37, a spiral spring 43 of which one end 44 is anchored to the shaft 31, while its other end 45 is attached to the revolving cage 37 by an anchoring pin 46.

Finally, the free-wheel mechanism 36 is fitted in such a way that the drum 38 is fixed to the plate 35 when the cable 39 unrolls following a pull exerted on the hook 41, while, on the contrary, during winding on, the plate 35 remains still when the drum 38 returns to re-wind the cable 39 under the return action of the spring 43.

The operation is similar to that described with reference to the first example. In particular, a braking is observed when the cable 39 is unwound, while, on the contrary the return of the cable takes place freely on re-winding by the action of the spring 43. It will be understood that the spring 43 may be chosen so as to store a negligable quantity of energy in relation to the kinetic energy brought into play during relative displacements of the trailer C and the vehicle B, given that it plays no part at all in the stabilization proper, and has the single purpose of returning the drum 38 to wind up the cable.

This system (FIGURES 4 and 5) has the advantage of being able to be housed in any place whatever. For example, the device $A_2$ may be mounted on the beam or pole of the house trailer, and the cable 39 led around a pulley fixed to the front of the house trailer on the desired side (for example, the right), in order to keep the length of cable which is attached to the vehicle B in the direction previously described.

There is shown in FIGURE 6 a constructional variant for a device A, of the kind shown in FIGURES 2 and 3. The originality of this variant comes from the fact that the braking on the sliding of the two telescopic bars 2 and 3 is ensured by hydraulic means 49 which may be of any known type. There may be, for example, a system in which a piston is displaced in oil, such as shown in FIGURE 5, of U.S. Patent 2,692,146, or else a gear pump of which the output is in closed circuit through a choke. In all cases the means of braking 49 are interposed between a shaft 13 welded to the bar 2 and the free-wheel 20 which carries the pinion 21. Thus the hydraulic means 49 ensure braking of movement in a single direction, as previously, owing to the operation of the free-wheel 20.

The variant illustrated in FIGURE 7 corresponds to a device $A_2$ with a cable 39, of the kind shown in FIGURES 4 and 5. However, this time hydraulic means of braking 49 are interposed between the fixed hollow casing 27 and the free-wheel 36, which is fitted to the revolving drum 37. The fixed end of the spring 43 is anchored to the shaft 31 which is fixed against rotation. Here again, the unwinding of the cable 39 is braked by hydraulic means 49, while on the contrary, the re-winding when the pulley 38 returns on itself by the action of the spring 43, takes place freely.

The scope of the invention will not be exceeded by using a free-wheel mechanism of any type whatever, or by replacing the chain 8 by any other system able to constitute a rack. Similarly, a device A may be mounted on the left side of the coupled units B–C.

I claim:

1. For use between a towing vehicle and a trailer vehicle, an anti-sway device to reduce sway of said trailer vehicle relatively to said towing vehicle, comprising an extensible device adapted for connection between said towing vehicle and said trailer vehicle in an asymmetrical manner whereby said extensible device will be subjected to length variations in response to misalignment of said towing vehicle and said trailer vehicle, a braking mechanism and unidirectional coupling means operatively connected between said extensible device and said braking mechanism.

2. An anti-sway device according to claim 1, wherein said unidirectional coupling means is a freewheel mechanism, and there is a transmission mechanism connected between said extensible device and said freewheel mechanism for converting rectilinear motion of said extensible device into rotary motion of said freewheel mechanism.

3. An anti-sway device according to claim 2, wherein said extensible device comprises two telescopic members adapted at their ends for attachment to said towing and trailer vehicles, and said transmission mechanism comprises a rack carried by one of said telescopic members and a pinion meshing with said rack, said pinion being operatively connected to said freewheel mechanism.

4. An anti-sway device according to claim 1, wherein said extensible device comprises two telescopic members adapted at their ends for attachment to said towing and trailer vehicles, a rack is carried by one of said telescopic members, and a pinion meshing with said rack is operatively connected to said unidirectional coupling means.

5. An anti-sway device according to claim 1, wherein said extensible device comprises a pulley adapted for securing to one of said towing and trailer vehicles, a cable anchored at one end to said pulley and adapted at its other end for securing to the other of said towing and trailer vehicles and spring load means applied to said pulley to resist rotation of said pulley due to unwinding of said cable.

6. An anti-sway device according to claim 5, in which said pulley is drivingly connected to said braking mechanism.

7. An antisway device according to claim 5, wherein said braking device comprises a fixed plate, a rotatable plate, a lining of friction material between said fixed and rotatable plates, said rotatable plate being fixed to said pulley, and adjustable pressure means for loading said fixed and rotatable plates towards each other.

8. An anti-sway device according to claim 5, wherein said braking device is constituted by a hydraulic brake.

9. An anti-sway device according to claim 1, wherein said braking device comprises a fixed plate, a rotatable plate, a lining of friction material between said fixed and rotatable plates, said rotatable plate being drivingly connected to said unidirectional coupling means and adjustable pressure means for loading said fixed and rotatable plates towards each other.

10. An anti-sway device according to claim 1, wherein said braking device is constituted by a hydraulic brake.

References Cited

UNITED STATES PATENTS

| 1,977,317 | 10/1934 | Maypole | 280—1.182 X |
| 2,692,146 | 10/1954 | Black | 280—432 |
| 3,273,911 | 9/1966 | Waldie | 280—446 |
| 3,294,421 | 12/1966 | Mathisen | 280—446 |
| 3,262,727 | 1/1968 | Malherbe | 280—446 |
| 2,612,382 | 9/1962 | Landis | 280—456 |
| 3,379,456 | 4/1968 | Bogle | 280—446 |
| 3,420,548 | 1/1969 | Wakeman | 280—432 |

FOREIGN PATENTS

| Ad. 90,447 | 10/1967 | France. |
| 1,490,600 | 6/1967 | France. |

LEO FRIAGLIA, Primary Examiner

U.S. Cl. X.R.

280—432, 456